US008774594B2

(12) United States Patent
Sato et al.

(10) Patent No.: US 8,774,594 B2
(45) Date of Patent: *Jul. 8, 2014

(54) CONTROLLED INFORMATION PROCESSING APPARATUS

(75) Inventors: Naoyuki Sato, Tokyo (JP); Makoto Sato, Tokyo (JP); Mari Horiguchi, Kanagawa (JP)

(73) Assignee: Sony Corporation (JP)

( * ) Notice: Subject to any disclaimer, the term of this patent is extended or adjusted under 35 U.S.C. 154(b) by 763 days.

This patent is subject to a terminal disclaimer.

(21) Appl. No.: 12/925,274

(22) Filed: Oct. 18, 2010

(65) Prior Publication Data

US 2011/0040832 A1 Feb. 17, 2011

Related U.S. Application Data

(63) Continuation of application No. 11/117,264, filed on Apr. 28, 2005, now Pat. No. 7,834,938, which is a continuation of application No. 09/691,951, filed on Oct. 19, 2000, now Pat. No. 6,931,199.

(30) Foreign Application Priority Data

Oct. 19, 1999 (JP) .................................. P11-296108

(51) Int. Cl.
*H04N 5/765* (2006.01)

(52) U.S. Cl.
USPC .......................................... 386/231; 386/234

(58) Field of Classification Search
USPC ...................... 386/200, 231, 230, 234; 725/59
See application file for complete search history.

(56) References Cited

U.S. PATENT DOCUMENTS

| 4,825,209 | A | * | 4/1989 | Sasaki et al. ................ 340/12.55 |
| 5,838,876 | A | | 11/1998 | Iwamura |
| 5,844,623 | A | | 12/1998 | Iwamura |
| 5,886,753 | A | * | 3/1999 | Shinyagaito et al. ........... 725/59 |
| 6,038,575 | A | | 3/2000 | Jensen et al. |
| 6,040,829 | A | | 3/2000 | Croy et al. |
| 6,133,847 | A | * | 10/2000 | Yang ........................... 340/12.25 |
| 6,141,022 | A | | 10/2000 | Anfossi et al. |
| 6,160,491 | A | | 12/2000 | Kitao et al. |
| 6,182,094 | B1 | * | 1/2001 | Humpleman et al. ........ 715/234 |
| 6,452,935 | B1 | | 9/2002 | Gibbs |
| 6,543,052 | B1 | | 4/2003 | Ogasawara |
| 6,603,488 | B2 | | 8/2003 | Humpleman et al. |
| 6,667,992 | B1 | | 12/2003 | Yanagawa |
| 6,728,244 | B1 | | 4/2004 | Takabatake |
| 6,931,199 | B1 | * | 8/2005 | Sato .............................. 386/230 |
| 7,039,936 | B1 | * | 5/2006 | Inoue et al. ..................... 725/59 |

(Continued)

FOREIGN PATENT DOCUMENTS

WO WO-9914946 3/1999

*Primary Examiner* — David Harvey
(74) *Attorney, Agent, or Firm* — Lerner, David, Littenberg, Krumholz & Mentlik, LLP

(57) ABSTRACT

A DTV operating screen is displayed on the CRT display screen of a DTV which is the controlling apparatus of a network. In the event that the user selects the DVHS from the buttons displayed on the DTV operating screen, data corresponding to the DVHS operation screen is input to the DTV, and a DVHS operation screen is displayed on the CRT display screen 61. The user operation executed regarding the DVHS operation screen are notified from the DTV to the DVHS, so the DTV can execute control corresponding to the operations of the user, without transmitting commands for directly controlling the DVHS.

8 Claims, 18 Drawing Sheets

(56) References Cited

U.S. PATENT DOCUMENTS

| | | |
|---|---|---|
| 7,119,710 B2 | 10/2006 | Hayes et al. |
| 7,684,671 B2 * | 3/2010 | Sato et al. ............ 386/231 |
| 7,821,582 B2 * | 10/2010 | Sato et al. ............ 348/734 |
| 7,834,938 B2 * | 11/2010 | Sato et al. ............ 348/734 |
| 2002/0047945 A1 | 4/2002 | Tanigawa et al. |
| 2002/0054017 A1 | 5/2002 | Agata et al. |
| 2002/0078445 A1 | 6/2002 | Sharif et al. |
| 2002/0078448 A1 | 6/2002 | Wakahara |
| 2003/0043128 A1 | 3/2003 | Kimura et al. |
| 2005/0185922 A1 | 8/2005 | Sato et al. |
| 2005/0191030 A1 | 9/2005 | Sato et al. |
| 2005/0198665 A1 | 9/2005 | Sato et al. |
| 2011/0040832 A1 * | 2/2011 | Sato et al. ............ 709/203 |

* cited by examiner

FIG. 6

| | msb | | | | | | | lsb |
|---|---|---|---|---|---|---|---|---|
| opcode | \multicolumn{8}{c|}{GUI_UPDATE(XX$_{16}$)} |
| operand[0] | \multicolumn{8}{c|}{source_plug} |
| operand[1] | \multicolumn{4}{c|}{support_model} | \multicolumn{4}{c|}{availability} |
| operand[2] | \multicolumn{8}{c|}{generation_ID} |
| operand[3] | \multicolumn{8}{c|}{subfunction} |
| operand[4] | \multicolumn{8}{c|}{scope} |

FIG. 7

| VALUE OF support_model | COMMENTS |
|---|---|
| $0_{16}$ | SUPPORTS EIA-775 MODEL |
| $1_{16}$ | SUPPORTS PANEL NATIVE MODE |
| OTHER | UNUSED AREA FOR ITEMS YET TO BE DEFINED |

FIG. 8

| VALUE OF availability | COMMENTS |
|---|---|
| $0_{16}$ | available |
| $1_{16}$ | occupied |
| OTHER | UNUSED AREA FOR ITEMS YET TO BE DEFINED |

FIG. 9

| VALUE OF generation_ID | COMMENTS |
|---|---|
| $00_{16}$ | GUI ELEMENT SETTINGS (FORMAT AND COMMANDS DEFINED IN VERSION 1.0 OF PANEL SUBUNIT SPECIFICATIONS) |
| OTHER | UNUSED AREA FOR ITEMS YET TO BE DEFINED |

FIG. 10

| VALUE OF subfunction | subfunction | COMMENTS |
|---|---|---|
| $00_{16}$ | start | PANEL SUB-UNIT STARTS NOTIFICATION OF GUI OF INSTRUCTED scope |
| $01_{16}$ | stop | PANEL SUB-UNIT TERMINATES UPDATING OF GUI |
| $02_{16}$ | change | PANEL SUB-UNIT CHANGES scope OF UPDATING OF GUI |
| OTHER | | UNUSED AREA FOR ITEMS YET TO BE DEFINED |

FIG. 11

| VALUE OF scope | scope | COMMENTS |
|---|---|---|
| $00_{16}$ | NO INFORMATION | Scope IS NOT SET |
| $01_{16}$ | DEVICE | PANEL SUB-UNIT NOTIFIES CHANGE OF ALL GUI ELEMENTS OF TARGET |
| $02_{16}$ | CURRENT PANEL | PANEL SUB-UNIT NOTIFIES CHANGE OF ALL GUI ELEMENTS OF CURRENT PANEL |

FIG. 12

| | msb | | | | | | | lsb |
|---|---|---|---|---|---|---|---|---|
| opcode | \multicolumn{8}{c|}{PUSH_GUI_DATA(XX₁₆)} |
| operand[0] | source_plug |
| operand[1] | subfunction |
| operand[2] | generation_number |
| operand[3] | |
| operand[4] | status |
| operand[5] | indicator |
| operand[6] | element_identifier |
| operand[7] | |
| operand[8] | |
| operand[9] | |

FIG. 13

| VALUE OF subfunction | subfunction | COMMENTS |
|---|---|---|
| $00_{16}$ | new | PANEL SUB-UNIT STARTS TRANSMISSION OF SPECIFIED GUI DATA |
| $01_{16}$ | clear | PANEL SUB_UNIT STOPS TRANSMISSION OF SPECIFIED GUI DATA |
| OTHER | | UNUSED AREA FOR ITEMS YET TO BE DEFINED |

FIG. 14

| VALUE OF status | status | COMMENTS |
|---|---|---|
| $00_{16}$ | no error | NO ERROR |
| $81_{16}$ | preparation | PANEL SUB-UNIT PREPARING TO TRANSMIT PANEL DATA |
| $82_{16}$ | source plug busy | PANEL SUB-UNIT TRANSMITTING PANEL DATA |
| $83_{16}$ | no element | SPECIFIED DATA DOES NOT EXIST WITHIN CURRENT AREA |
| $84_{16}$ | not connected | SPECIFIED SOURCE PLUG IS NOT CONNECTED TO ANY ASYNCHRONOUS PLUG |
| $85_{16}$ | not owner | CONTROLLER IS NOT THE OWNER OF SPECIFIED SOURCE PLUG |
| $86_{16}$ | canceled | CANCELLED DURING DATA TRANSMISSION |
| $87_{16}$ | not transmitting | SPECIFIED DATA IS NEITHER BEING PREPARED NOR BEING TRANSMITTED |
| $EF_{16}$ | any other error | OTHER INTERNAL ERROR OF PANEL SUB-UNIT |
| OTHER | | UNUSED AREA FOR ITEMS YET TO BE DEFINED |

FIG. 15

|  | msb | | | | | | lsb |
|---|---|---|---|---|---|---|---|
| opcode | \multicolumn{7}{c}{USER_ ACTION($XX_{16}$)} |
| operand[0] | source_plug |||||||
| operand[1] | generation_number |||||||
| operand[2] | |||||||
| operand[3] | element_identifier |||||||
| operand[4] | |||||||
| operand[5] | |||||||
| operand[6] | |||||||
| operand[7] | action_type |||||||
| operand[8] | data |||||||
| ⋮ | |||||||
| ⋮ | |||||||

FIG. 16

| action_type | VALUE OF action_type | DATA FIELD | COMMENTS |
|---|---|---|---|
| select | 00₁₆ | UNUSED | SELECTION BY USER |
| press | 01₁₆ | UNUSED | BUTTON PRESSED BY USER |
| release | 02₁₆ | UNUSED | RELEASE BY USER |
| set_value | 03₁₆ | 8-bit VALUE | SETTING VALUE INPUT BY USER |
| enter_data | 04₁₆ | TEXT DATA | DATA INPUT BY USER LENGTH OF DATA DIFFERS ACCORDING TO USER INPUT |
| choose_list | 05₁₆ | ELEMENT ID | ELEMENT SELECTED BY USER INPUT LENGTH OF DATA DIFFERS ACCORDING TO USER INPUT |

CONTROLLED INFORMATION PROCESSING APPARATUS

CROSS REFERENCE OF PATENT APPLICATIONS

This application is a continuation of U.S. application Ser. No. 11/117,264, filed on Apr. 28, 2005, which is a continuation of U.S. application Ser. No. 09/691,951, filed Oct. 19, 2000, now U.S. Pat. No. 6,931,199, the entire contents of which are incorporated herein by reference, which claims priority from Japanese Patent Application No. JP 11-296108 filed in the Japanese Patent Office on Oct. 19, 1999.

BACKGROUND OF THE INVENTION

1. Field of the Invention

The present invention relates to an information processing apparatus and method, information processing system, and recording medium, and particularly relates to an information processing apparatus and method, information processing system, and recording medium wherein a controlled apparatus connected to a network transmits control screen data of itself to a controlling apparatus for display thereupon, and the contents of operation executed by the user making reference to the display screen of the controlling apparatus are notified to the controlled apparatus by the controlling apparatus, thereby allowing other apparatuses to be controlled without issuing control commands.

2. Description of the Related Art

Home network systems such as the IEEE1394 serial bus can be used to connect multiple information processing apparatuses (e.g., DTV (Digital Television), DVHS (Digital Video Home System), IRD (Integrated Receiver Decoder), etc.) and carry out playing and recording of video and audio information, or to transmit and receive information between information processing apparatuses to carry out editing processing such as dubbing. Conventionally, control of the controlled information processing apparatus is carried out by the controlling information processing apparatus issuing AV/C (Audio Video/Control) commands to the controlled information processing apparatus.

However, in the event that the controlling apparatus needs to transmit control commands to a controlled apparatus in order to control processing executed by another apparatus on a network with multiple information processing apparatuses connected, and in the event that multiple controlled apparatuses exist, the controlling apparatus has had to record all control commands for controlling each controlled apparatus.

SUMMARY OF THE INVENTION

The present invention has been made in light of the above, and accordingly it is an object of the present invention to enable a controlling apparatus to control the processing of a controlled apparatus without the controlling apparatus transmitting control commands of the processing to be executed by the controlled apparatus, by means of displaying a control screen for a controlled apparatus on the display screen of the controlling apparatus, and notifying the controlled apparatus of the operation which the user has performed on the control screen of the controlled apparatus displayed on the controlling apparatus (the location of the operations and the contents thereof, such as "button A" has been "pressed").

The information processing apparatus according to a first aspect of the present invention comprises:

first display control means for controlling the display of a first control screen for controlling the other information processing apparatuses connected to the network from itself;

receiving means for receiving, from a selected information processing apparatus via the network, second control screen data for controlling at least the selected information processing apparatus, in the event that a predetermined information processing apparatus is selected from the other information processing apparatuses, based on the first control screen;

second display control means for controlling display of the second control screen received by the receiving means; and output means for outputting signals corresponding to input to the selected information processing apparatus, in the event that predetermined instructions are input, based on the second control screen.

The information processing method according to a second aspect of the present invention comprises:

a first display control step for controlling the display of a first control screen for controlling the other information processing apparatuses connected to the network from itself;

a receiving step for receiving, from a selected information processing apparatus via the network, second control screen data for controlling at least the selected information processing apparatus, in the event that a predetermined information processing apparatus is selected from the other information processing apparatuses, based on the first control screen;

a second display control step for controlling display of the second control screen received by the processing of the receiving step; and an output step for outputting signals corresponding to input to the selected information processing apparatus, in the event that predetermined instructions are input, based on the second control screen.

The recording medium according to a third aspect of the present invention records a program comprising:

a first display control step for controlling the display of a first control screen for controlling the other information processing apparatuses connected to the network from itself;

a receiving step for receiving, from a selected information processing apparatus via the network, second control screen data for controlling at least the selected information processing apparatus, in the event that a predetermined information processing apparatus is selected from the other information processing apparatuses, based on the first control screen;

a second display control step for controlling display of the second control screen received by the processing of the receiving step; and an output step for outputting signals corresponding to input to the selected information processing apparatus, in the event that predetermined instructions are input, based on the second control screen.

The information processing apparatus according to a fourth aspect of the present invention comprises:

output means for outputting control screen data for controlling itself to the other information processing apparatuses via the network;

receiving means for receiving signals corresponding to input from the other information processing apparatuses via the network, in the event that predetermined instructions are input based on the control screen, at the other information processing apparatuses; and executing means for executing processing corresponding to the signals received by the receiving means.

The information processing method according to a fifth aspect of the present invention comprises:

an output step for outputting control screen data for controlling itself to the other information processing apparatuses via the network;

a receiving step for receiving signals corresponding to input from the other information processing apparatuses via the network, in the event that predetermined instructions are input based on the control screen, at the other information processing apparatuses; and an executing step for executing processing corresponding to the signals received by the processing of the receiving step.

The recording medium according to a sixth aspect of the present invention records a program comprising:

an output step for outputting control screen data for controlling itself to the other information processing apparatuses via the network;

a receiving step for receiving signals corresponding to input from the other information processing apparatuses via the network, in the event that predetermined instructions are input based on the control screen, at the other information processing apparatuses; and an executing step for executing processing corresponding to the signals received by the processing of the receiving step.

With the information processing system according to a seventh aspect of the present invention;

a first information processing apparatus comprises:

first display control means for controlling the display of a first control screen for controlling the other information processing apparatuses, including the second information processing apparatus, connected to the network from itself;

receiving means for receiving, from the second information processing apparatus via the network, second control screen data for controlling at least the second information processing apparatus, in the event that the second information processing apparatus is selected from the other information processing apparatuses, based on the first control screen;

second display control means for controlling display of the second control screen received by the receiving means; and output means for outputting signals corresponding to input to the second information processing apparatus, in the event that predetermined instructions are input, based on the second control screen; and a second information processing apparatus comprises:

output means for outputting control screen data for controlling itself to the first information processing apparatuses via the network;

receiving means for receiving signals corresponding to input from the first information processing apparatuses via the network, in the event that predetermined instructions are input based on the control screen, at the first information processing apparatus; and executing means for executing processing corresponding to the signals received by the receiving means.

With the information processing apparatus according to the first aspect, the information processing method according to the second aspect, and the recording medium according to the third aspect, the display of a first control screen for controlling the other information processing apparatuses connected to the network from itself is controlled, second control screen data for controlling at least the selected information processing apparatus is received from a selected information processing apparatus via the network in the event that a predetermined information processing apparatus is selected from the other information processing apparatuses, based on the first control screen, display of the second control screen received by the receiving means is controlled, and in the event that predetermined instructions are input based on the second control screen, signals corresponding to the input are output to the selected information processing apparatus.

With the information processing apparatus according to the fourth aspect, the information processing method according to the fifth aspect, and the recording medium according to the sixth aspect, control screen data for controlling itself is output to the other information processing apparatuses via the network, signals corresponding to input from the other information processing apparatuses via the network are received in the event that predetermined instructions are input based on the control screen at the other information processing apparatuses, and processing corresponding to the received signals is executed.

With the information processing system according to the seventh aspect, at the first information processing apparatus, the display of a first control screen for controlling another information processing apparatuses connected to the network containing the information processing apparatuses from itself is controlled, second control screen data for controlling at least the second information processing apparatus is received from the second information processing apparatus via the network in the event that the second information processing apparatus is selected from the other information processing apparatuses, based on the first control screen, display of the second control screen received by the receiving means is controlled, and in the event that predetermined instructions are input based on the second control screen, signals corresponding to the input are output to the second information processing apparatus, and at the second information processing apparatus, control screen data for controlling itself is output to the first information processing apparatus via the network, signals corresponding to input from the first information processing apparatus via the network are received in the event that predetermined instructions are input based on the control screen at the first information processing apparatus, and processing corresponding to the received signals is executed.

BRIEF DESCRIPTION OF THE DRAWINGS

FIG. 6 is a diagram for describing the GUI_UPDATE command;

FIG. 7 is a diagram for describing the data of the support_model area;

FIG. 8 is a diagram for describing the data of the availability area;

FIG. 9 is a diagram for describing the data of the generation_ID area;

FIG. 10 is a diagram for describing the data of the subfunction area;

FIG. 11 is a diagram for describing the data of the scope area;

FIG. 12 is a diagram for describing the PUSH_GUI_DATA command;

FIG. 13 is a diagram for describing the data of the subfunction area;

FIG. 14 is a diagram for describing the data of the status area;

FIG. 15 is a diagram for describing the USER_ACTION command;

FIG. 16 is a diagram for describing the data of the action_type area;

DESCRIPTION OF THE PREFERRED EMBODIMENTS

Figure 1:
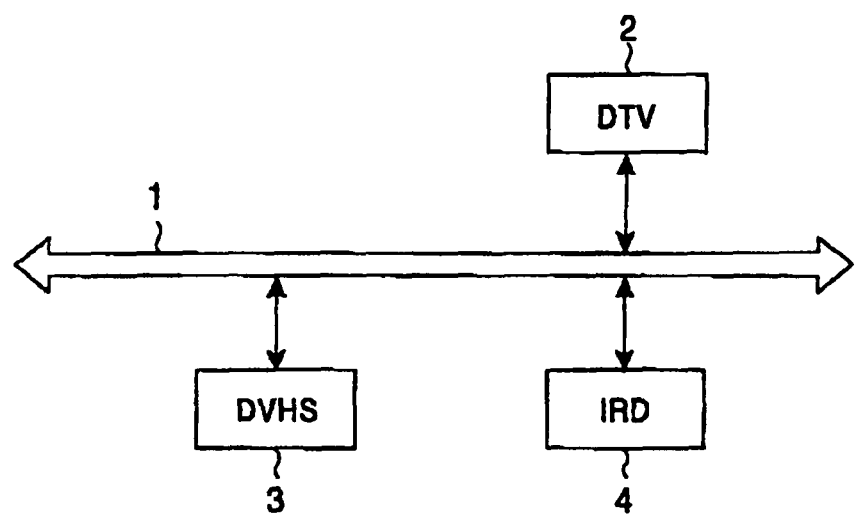
FIG. 1 is a block diagram illustrating the configuration of a network system.

FIG. 1 is a block diagram illustrating the configuration of a network system wherein multiple information processing apparatuses are connected to a home network or the like.

Connected to the IEEE1394 serial bus 1 are a DTV 2, DVHS 3, and an IRD 4. The DTV 2 transmits signals to the DVHS 3 and IRD 4 via the IEEE1394 serial bus 1 inquiring the GUID (Global Unique Identifier) or functions held by each. The DVHS and IRD 4 transmit signals indicating their own GUID or functions to the DTV 2, in response to the inquiry signals received. The DTV 2 detects the connection state of the devices connected to the IEEE1394 serial bus 1 from this information, and displays a GUI (Graphical User Interface) for selecting these functions on the CRT (Cathode Ray Tube) described later with reference to FIG. 2.

The DVHS 3 can transmit to the IRD 4 AV/C commands for directly controlling the processing which the IRD 4 can execute, but the DTV 2 does not have AV/C commands for directly controlling the processing executed by the DVHS 3 and IRD 4.

Figure 2:
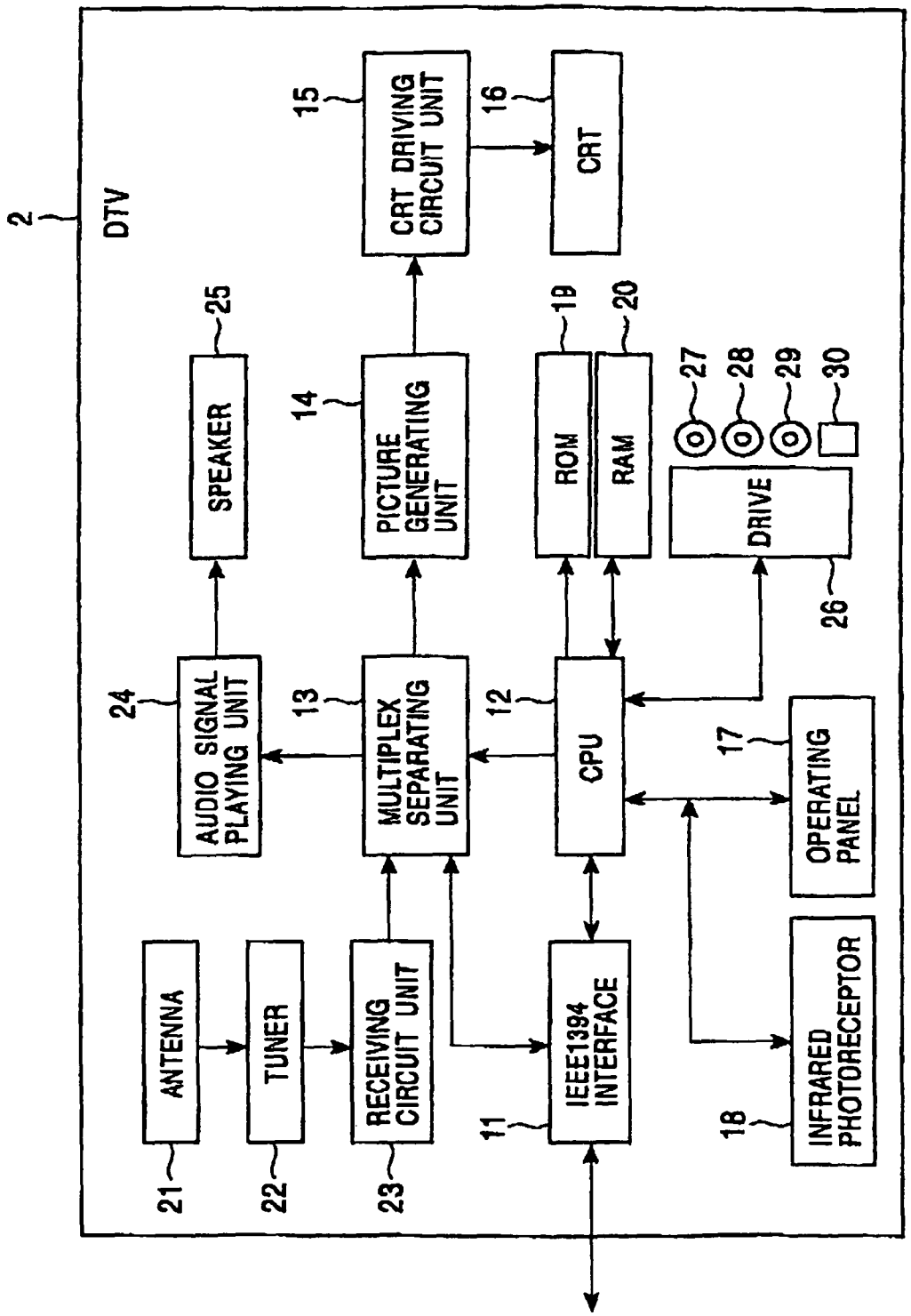
FIG. 2 is a block diagram illustrating the detailed configuration of the DTV shown in FIG. 1.

FIG. 2 is a block diagram illustrating the detailed configuration of the DTV 2. Signals indicating the GUID or functions transmitted from the DVHS 3 and IRD 4 via the IEEE1394 serial bus 1 are input to the CPU 12 via the IEEE1394 interface 11. The CPU 12 generates signals corresponding to the GUI for selecting the DVHS 3 and IRD 4 based on the input signals indicating the GUID or functions, and transmits the signals to the picture generating unit 14 via the multiplex separating unit 13. The picture generating unit 14 generates picture signals corresponding to the input signals, and outputs these signals to the CRT driving circuit 15. The CRT driving circuit 15 takes the vertical synchronizing and horizontal synchronizing of the input picture signals, and outputs the picture signals to the CRT 16, where the signals are displayed.

The user makes reference to the display on the CRT 16 and operates the operating panel 17 or an unshown remote commander, selects a desired device from the DVHS 3 or IRD 4 connected to the IEEE1394 serial bus 1, and further instructs the processing for the selected device to execute. In the event that the user operates the remote commander, the infrared photoreceptor 18 receives infrared signals representing the operations of the user from the remote commander. The CPU 12 supplies broadcast waves received with the antenna 21 and control signals generated by the CPU 12, for example, based on the signals representing the operation of the user, input from the operating panel 17 or the infrared photoreceptor 18, to the DVHS 3 or IRD 4 via the IEEE1394 interface 11 and IEEE1394 serial bus 1.

The ROM 19 stores programs and the like for the CPU 12 to execute, and data necessary for the GUI display on the CRT 16 (e.g., data corresponding to icons). These programs and data are read out to the CPU 12 as necessary. The RAM 20 stores data and the like generated by the executing of the programs.

The broadcast waves received with the antenna 21 are demodulated with the tuner 22, decoded by the receiving circuit unit 23, and input to the multiplex separating unit 13. The multiplex separating unit 13 separates signals corresponding to broadcast waves into audio signals and picture signals for example, based on the control signals input from the CPU 12, and the signals are respectively output to the speakers 25 via an audio signal playing unit 24 and to the CRT 16 via the picture generating unit and CRT driving circuit unit 15, or supplied to the DVHS 3 via the IEEE1394 interface 11 and IEEE1394 serial bus 1.

A drive 26 is connected to the CPU 12, to which a magnetic disk 27, optical disk 28, magneto-optical disk 29, and semiconductor memory 30, etc., can be inserted. The CPU 12 can read out the data stored in the magnetic disk 27, optical disk 28, magneto-optical disk 29, and semiconductor memory 30.

Figure 3:
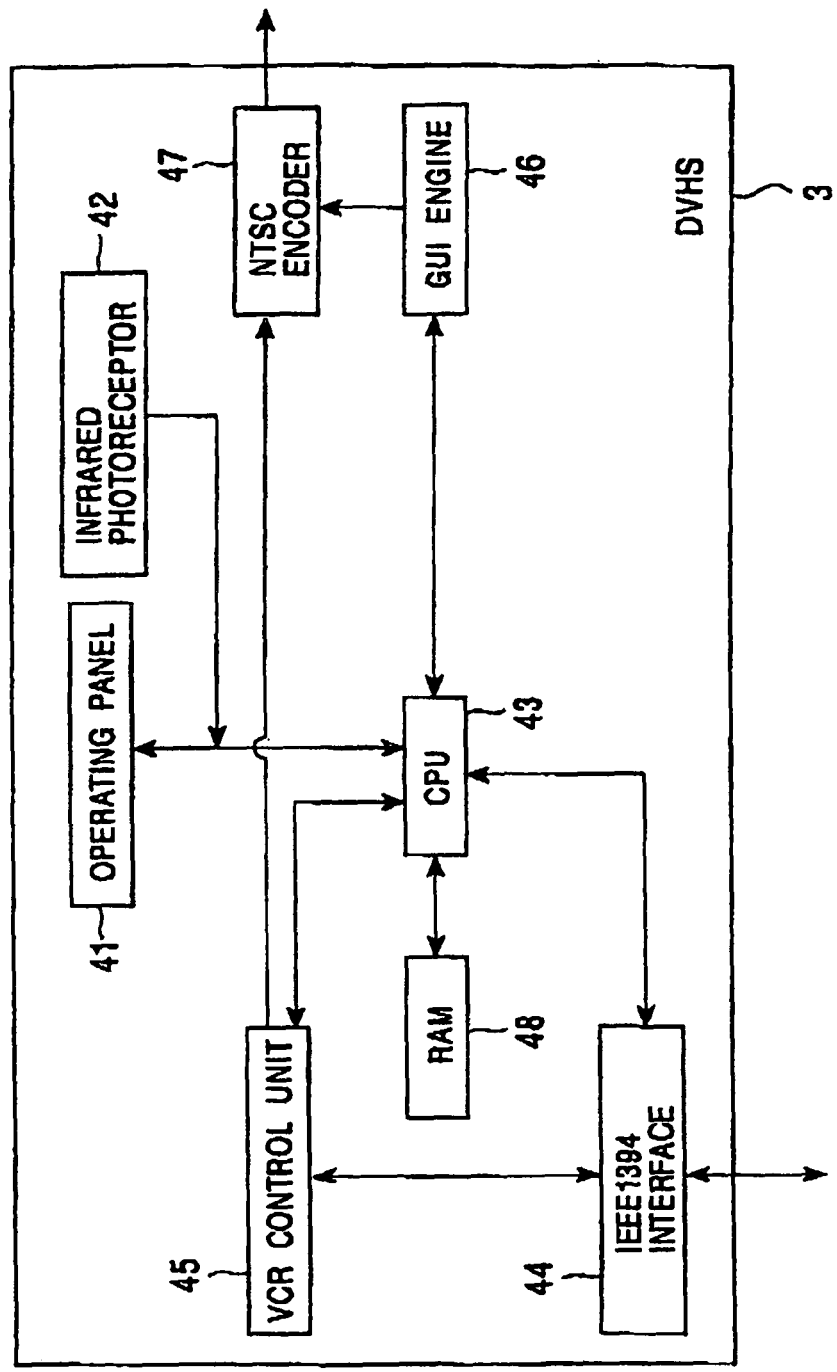
FIG. 3 is a block diagram illustrating the detailed configuration of the DVHS shown in FIG. 1.

FIG. 3 is a block diagram illustrating the detailed configuration of the DVHS 3. In the event that the user operates the operating panel 41 or an unshown remote commander, the CPU 43 receives input of signals corresponding to the operations of the user from the operating panel 41 or the infrared photoreceptor 42 (in the event that the user operates the remote commander, the infrared photoreceptor 42 receives infrared signals representing the operations of the user from the remote commander, and outputs the signals to the CPU 43). Also, the CPU 43 inputs control signals from other devices connected to the IEEE1394 serial bus 1 via the IEEE1394 serial bus 1 and IEEE1394 interface 44.

The CPU 43 generates control signals for controlling the VCR control unit 45 for example, based on these signals, and outputs these control signals to the VCR control unit 45. Based on the control signals input from the CPU 43, the VCR control unit 45 performs actions such as recording picture data input from another device via the IEEE1394 serial bus 1 and IEEE1394 interface 44 on an unshown video cassette tape, and transmitting picture data recorded on the unshown video cassette tape to other devices connected to the IEEE1394 serial bus 1, via the IEEE1394 interface 44 and IEEE1394 serial bus 1, for example.

Figure 23:
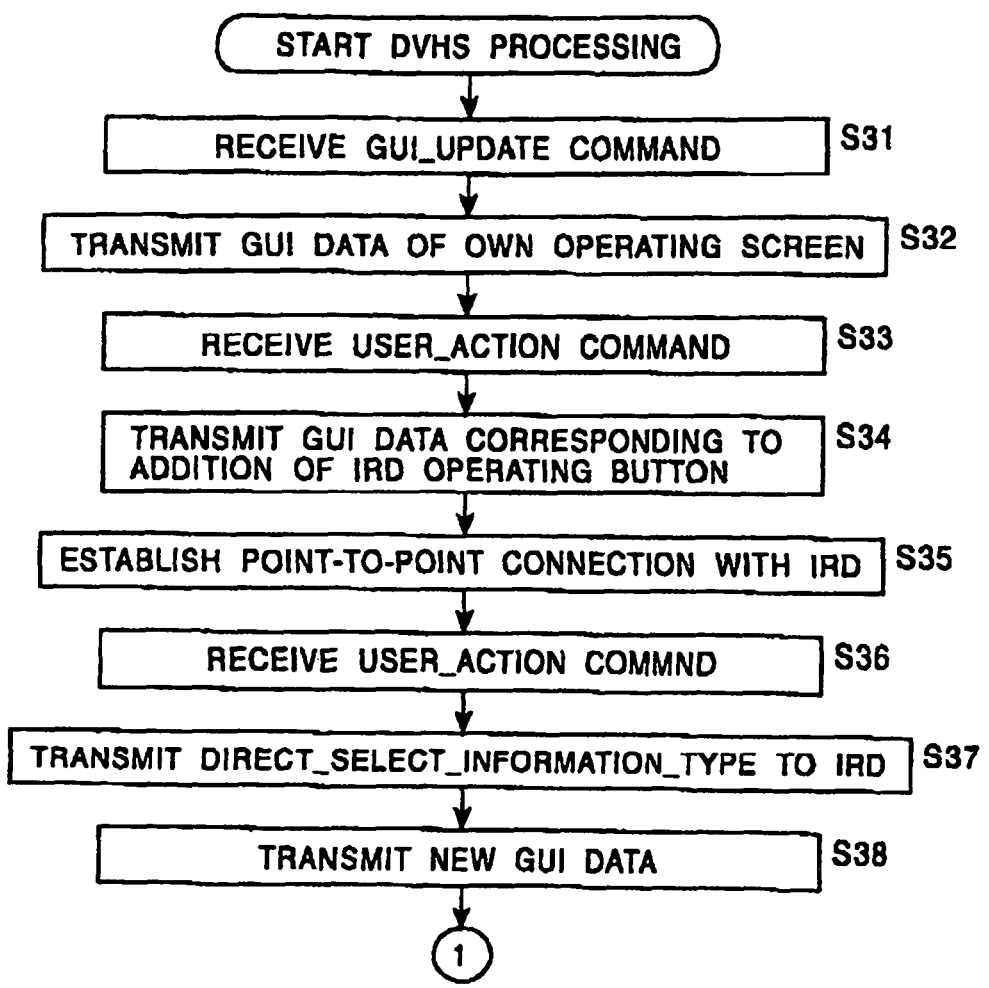
FIG. 23 is a flowchart for describing the processing of the DVHS.
Figure 24:
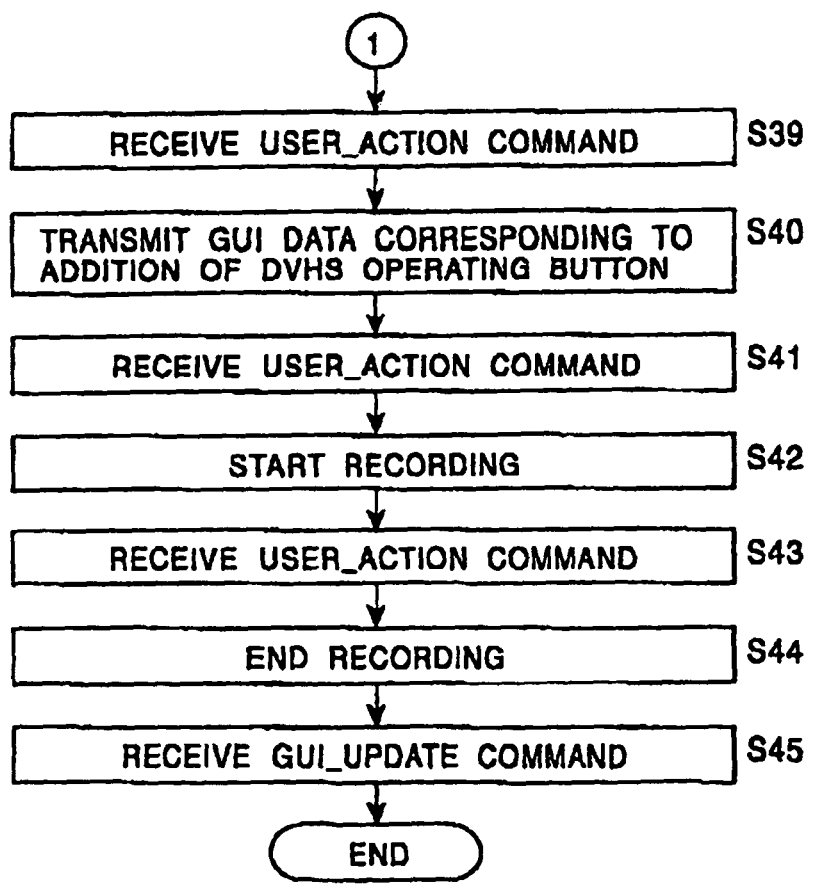
FIG. 24 is a flowchart for describing the processing of the DVHS.

Also, if necessary the CPU 43 performs actions such as controlling the GUI engine 46 to create image data and GUI data representing the menu screen and outputs the GUI data to the NTSC (National TV Standards committee) encoder 47 so as to be converted into NTSC data and displayed as the menu screen on a unshown monitor, and transmitting the image data and GUI data representing the menu screen to the DTV 2 via the IEEE1394 interface 44 and IEEE1394 serial bus 1, by later-described processing described with reference to FIGS. 23 and 24.

Further, the CPU 43 can perform actions such as reading out programs and data stored in the RAM 48, and saving data to the RAM 48 as necessary. The RAM 48 saves programs to be executed by the CPU 43 AV/C commands for controlling the IRD 4, and so forth.

Figure 4:
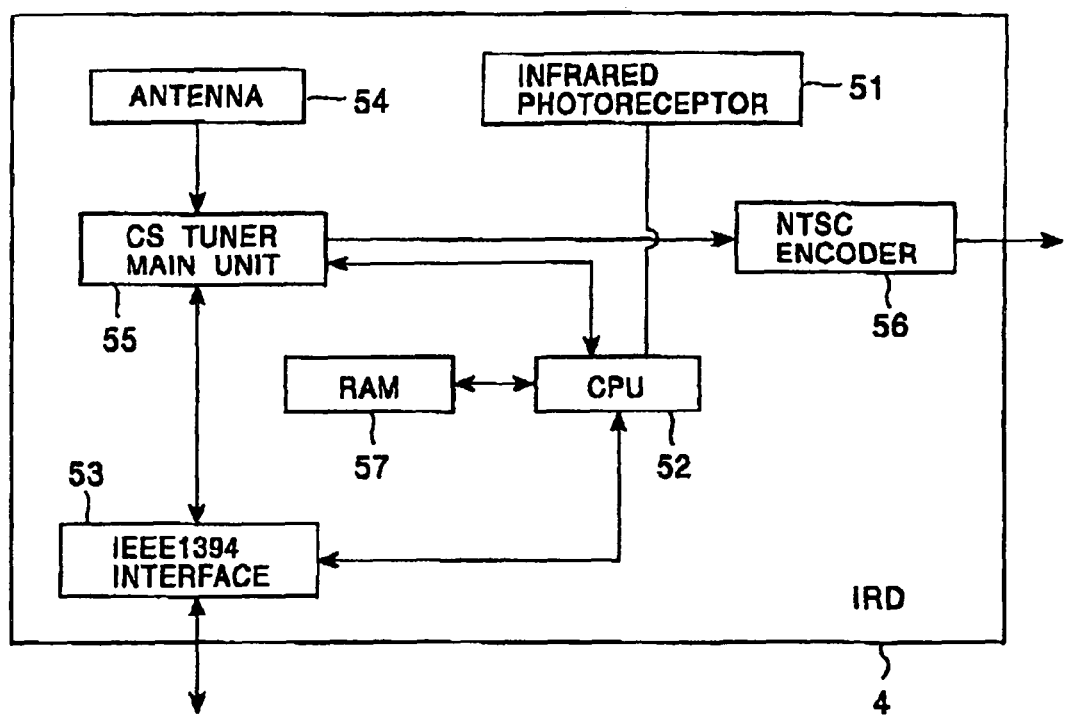
FIG. 4 is a block diagram illustrating the detailed configuration of the IRD shown in FIG. 1.

FIG. 4 is a block diagram illustrating the detailed configuration of the IRD 4. In the event that the user operates the unshown remote commander, the infrared photoreceptor 51 receives infrared signals representing the operations of the user from the remote commander. The infrared photoreceptor 51 outputs signals corresponding to the operation of the user to the CPU 52. The CPU 52 receives input of control signals from other devices connected to the IEEE1394 serial bus 1 via the IEEE1394 serial bus 1 and IEEE1394 interface 53.

Based on these signals, the CPU 52 generates control signals for controlling the CS (Communications Satellite) tuner main unit 55 for example, and outputs these to the CS tuner main unit 55. Signals received with the antenna 54 are input to the CS tuner main unit 55. The CS tuner main unit 55 performs demodulation and de-scrambling of the input received signals according to the signals input from the CPU 52, outputs the signals to the NTSC encoder 56 where they are converted into NTSC data, which is displayed on an unshown monitor or transmitted to other devices connected to the IEEE1394 serial bus 1 via the IEEE1394 interface 53 and IEEE1394 serial bus 1. Further, the CPU 52 saves data in the RAM 57 and reads out data saved in the RAM 57, as necessary.

Now, in the network shown in FIG. 1, the user does not directly perform instructions to each of the devices using the remote commander or the like of the corresponding device, but rather uses the DTV 2 as the controller and the DVHS 3 as a target (panel sub-unit) and displays the operating screen (panel) of the DVHS 3 on the operating screen displayed on the CRT 16 of the DTV 2, thereby using the operating screen displayed on the DTV 2 to perform operations regarding the DVHS 3 and the IRD 4.

Figure 5:
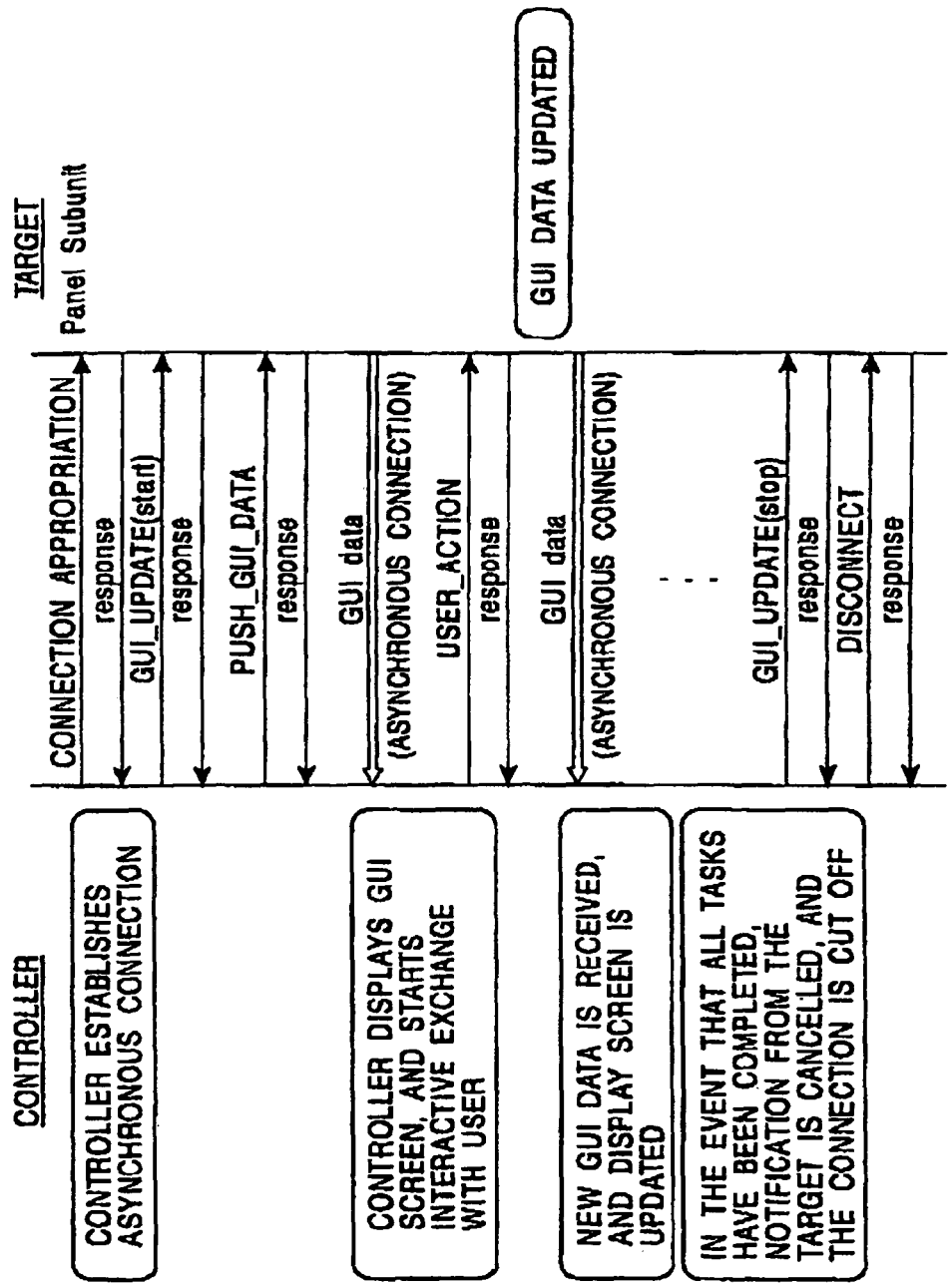
FIG. 5 is a flowchart for describing exchange of data between the controller and the target.

Next, the exchange of data between the controller and target for displaying the operating screen of the DVHS 3 on the operating screen of the DTV 2 will be described, with reference to FIG. 5.

The controller appropriates a connection to the target. The target returns a response to the controller corresponding to the connection appropriation, thereby establishing the connection. With this connection, a greater amount of data is transmitted from the target to the controller, in comparison with the amount of data transmitted from the controller to the target. In this way, the Asymmetric Data Transfer (ADT) model is used for the data exchange between the controller and target. In this ADT model, control signals from the controller to the target are transmitted using panel sub-unit commands, and on the other hand, GUI data from the target to the controller is transmitted using an asynchronous connection. The panel sub-unit commands are the GUI_UPDATE command which will be described later with reference to FIG. 6, the PUSH_GUI_DATA command which will be described later with reference to FIG. 12, and the USER_ACTION command which will be described later with reference to FIG. 15.

The controller transmits the GUI_UPDATE command and PUSH_GUI_DATA command to the target, the target receives the commands, and returns a response to the controller. The GUI_UPDATE command will be described with reference to FIG. 6. The GUI_UPDATE command is a command which causes the controller to check the generation ID of the panel sub-unit, thereby confirming the generation (version) of the corresponding panel sub-unit, and requesting a new GUI element from the target. This command is defined by a control command and status command.

The source plug No. is specified as a condition for the source_plug area. The source plug (i.e., device connected to the network) specified in this area outputs GUI data to the controller. In the event that the controller transmits the GUI_UPDATE command with "start" described in the later-described sub-function area to the source plug, and obtains a response of "accept" from the source plug, the controller can become the owner of the corresponding source plug. A source plug support model is specified as a condition to the support_model area. The values of the support model are shown in FIG. 7.

The validity (available space) of the source plug is specified as a condition to the availability area. Example values of availability are shown in FIG. 8. In the event that the source plug is "available", the controller can use the source plug with the model specified in the support model area.

For example, in the event that the source plug of the panel sub-unit acts as an EIA (Electronic Industries Association)-775 model, and supports multicasting of EIA-7750SD data, the availability area is always set to "0". In other cases, in the event that the controller is using the source plug, the availability area value is set to "1".

Described in the generation ID area is which generation of AV/C panel sub-unit element is used for the corresponding sub-unit. The definitions of the generation ID value are shown in FIG. 9.

The functions of the command are described in the sub-functions area. For example, in the event that the controller attempts to execute processing using the panel sub-unit, or in the event that the controller attempts to change the range specified by the values in the later-described scope area, "start" is described in the sub-function area, and transmitted to the corresponding target. Then, the panel sub-unit which has received this GUI_UPDATE command starts the processing of transferring the GUI data by asynchronous connection.

Also, in the event that the processing which the controller and the panel sub-unit are executing together ends, the controller transmits a GUI_UPDATE command with a "stop" sub-function described, to the panel sub-unit. The, the panel sub-unit which has received this GUI_UPDATE command stops transmission of the changed data. Following transmitting of the GUI_UPDATE command with "stop" described to the sub-function area, the controller can start the processing again by transmitting to the target a GUI_UPDATE command with "start" described in the sub-function area once more, in the event that the asynchronous connection with the source plug is not cut off. FIG. 10 shows the definitions of the sub-function values. The "stop" and "change" sub-functions are valid only for notification of the owner of the corresponding source plug.

The scope (data range) of the panel sub-unit specified by the controller is described in the scope area. In the event that the scope value represents the current panel until the panel sub-unit receives the first PUSH_GUI_DATA, the current panel represents the basic panel. The definitions of the scope value are shown in FIG. 11.

Next, the PUSH_GUI_DATA command will be described with reference to FIG. 12. The PUSH_GUI_DATA command request a GUI update from the panel sub-unit in the event that the GUI data is changed. This command is defined by a control command and status command.

The source plug No. is specified as a condition for the source_plug area. The source plug specified in this area outputs the GUI data. In the event that the controller is not the owner of the corresponding source plug specified here (whether or not the controller is the owner of the source plug is determined by the response of the target as to the GUI_UPDATE command, described with reference to FIG. 6), the panel sub-unit receiving the PUSH_GUI_DATA command returns a "rejected" response, indicating rejection.

The functions of the command are described in the sub-functions area. FIG. 13 illustrates the definitions of the sub-function values. In the event that the controller attempts to obtain the GUI data of the panel sub-unit using asynchronous connection, "new" is described to the sub-function area. In the same way, in the event that the controller attempts to stop reception of GUI data using asynchronous connection, "clear" is described to the sub-function area.

The current panel generation of the scope (range of data) specified by the controller is described in the generation number area. At the point that the controller initially transmits this command, the generation No. area is set to FF.sub.(16). Then, the panel sub-unit describes the current generation No. of the specified scope in the response to this command, and returns it. In the event that the returned generation No. is 00.sub.(16), this panel sub-unit cannot change the GUI element within the panel.

The current states of the panel sub-unit is described within the status area. For example in the event that the controller is generating a command, the value of the status area is FF.sub.(16). The panel sub-unit, upon receiving this, returns the current status of itself. The definitions of the status area value are shown in FIG. 14.

The GUI element requested at the later-described element identifier area is described in the indicator area. "with_data" and "level" are described in the indicator area. "with_data" is represented by one bit, and indicates whether or not a data element directly linked to from the specified element is requested along with the specified element. In the event that "with_data" is set to "1", the panel sub-unit transmits the data directly linked to along with the specified element, to the controller. In the event that "with_data" is set to "0", the panel sub-unit transmits only the specified element to the controller, and other data elements are not transmitted. "Level" specifies the data request level, such as whether the GUI element requested by the controller is only the specified GUI element, or up to data directly linked to, or all GUI data, and so forth.

Independent identification names of the panel, group, GUI element, etc., contained in the panel data configuration, are described in the element identifier area. Element types are also described in the element identifier area, thereby performing identification with the description of this portion such as whether the requested GUI element is a panel or device icon, and so forth.

Now, returning to FIG. 5, description will be made regarding data exchange between the controller and target for displaying the operating screen of the DVHS 3 on the operating screen of the DTV 2.

The target, upon receiving a data update request from the controller, transmits its own control screen GUI data to the controller, suing asynchronous connection. The controller displays the GUI screen of the target, and starts an interactive dialogue with the user.

In the event that the user uses the GUI displayed on the display screen of the controller to performed an operation of specifying some sort of processing to the target, the contents of the operation are transmitted to the target using the USER_ACTION command. Then, the target which has received the USER_ACTION command performs processing based on the contents of the command, and transmits the processing results to the controller. For example, in the event that the user presses the GUI button on the operating screen of the controller to place the apparatus corresponding the target in a "rewind mode", the controller transmits a USER_ACTION command to the target indicating that the "rewind mode" button has been "pressed". The target transmits a response to the controller indicating the success (or failure) of the command. Also, in the event that the GUI data of the target is changed by the target receiving the USER_ACTION command and executing the processing, the new GUI data is transmitted to the controller using asynchronous connection. The controller receives the new GUI data, and updates the screen display.

The controller and target execute processing according to the operation of the user, repeating the exchange of USER_ACTION commands and exchange of GUI data. In the event that all tasks have been completed, the controller transmits a GUI_UPDATE command with "stop" described in the sub-function area to the target, thereby cutting off the connection with the target.

The USER_ACTION command will be described with reference to FIG. 15. A user action control command is a command for notifying a target of an operation which the user has performed regarding a target GUI component displayed on the display screen of the controller. The USER_ACTION control command can only transmit to the owner of the source plug. The source plug ignores user action commands transmitted from other controllers which are not the owner thereof.

The source plug No. is specified as the condition for the source plug area, and the source plug specified here outputs the GUI data. The generation No. area describes the current panel generation of the scope (range of data) specified by the controller.

Independent identification names of the panel, group, GUI element, etc., contained in the panel data configuration, are contained in the element identifier area. That is, the target can recognize which part on the panel which the user has performed operation upon, by making reference to the identification name.

Values indicating the type of action regarding the GUI element (e.g., "select", "press", etc.) are described in the action_type area. Also, the data area contains data specified by each action type. The relation between the values of the action type area and the data areas thereof is shown in FIG. 16.

Next, the processing performed by the DTV 2 will be described with reference to the flowcharts in FIGS. 17 and 18. Here, a connection has already been established as in FIG. 1, and asynchronous connection is established with the DTV 2 as the controller and the DVHS 3 as the target.

Figure 19:
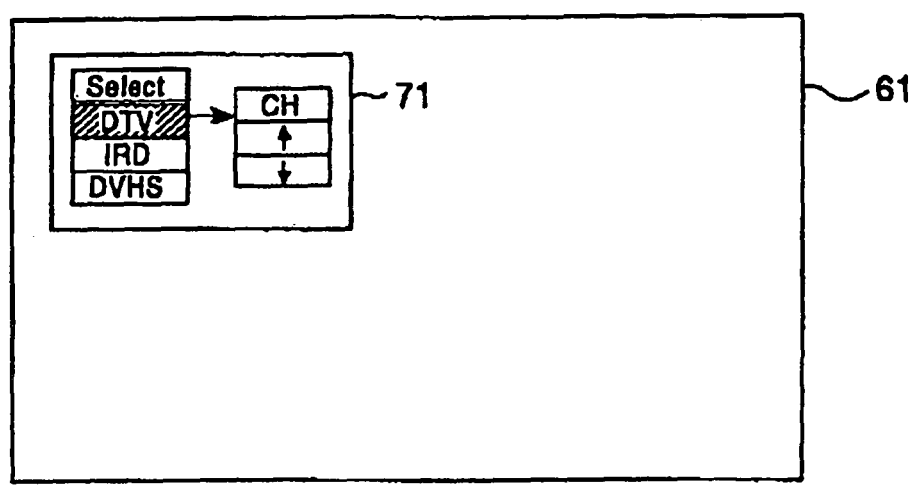
FIG. 19 is a diagram for describing the processing screen displayed on the DTV.

In step S1, the CPU 12 reads out data for displaying the DTV operating screen 71 on the CRT display screen 61 shown in FIG. 19, from the ROM 19, outputs this to the picture generating unit 14 via the multiplex separating unit 13, converts this into image data at the picture generating unit 14, takes vertical synchronization and horizontal synchronization at the CRT driving circuit 15, and outputs to the CRT 16, where display is made. Buttons for the user to instruct the operation of the DTV 2 are displayed on the DTV operating screen 71 displayed on the CRT display screen 61 (in this case, buttons for instructing channel specification), and also, icons for selecting the DVHS 3 and the IRD 4 connected to the network are displayed, so that the user can execute processing of the DVHS 3 and the IRD 4 using this display screen.

In step S2, the user selects the icon of the DVHS 3 on the DTV operating screen 71 shown in FIG. 19. The signal indicating selection by the user is input to the CPU 12 from the operating panel 17 or the infrared photoreceptor 18.

In step S3, the CPU 12 transmits to the DVHS 3 a GUI_UPDATE command with "start" described in the sub-function area thereof via the IEEE1394 interface 11 and IEEE1394 serial bus 1, in order to request panel data for performing operation of the DVHS 3. The DVHS 3 which has received the GUI_UPDATE command confirms that the DTV 2 is the owner of the source plug, and following a response being returned, GUI data for display a panel for itself is transmitted to the DTV 2 using asynchronous connection (the processing in step S32 in the later-described FIG. 23).

In step S4, the IEEE1394 interface 11 receives the GUI data transmitted from the DVHS 3, and outputs signals to the CPU 12 indicating that new GUI data has been received.

In step S5, the CPU 12 outputs the data received by the IEEE1394 interface 11 in step S4 via the multiplex separating unit 13, picture generating unit 14, and CRT driving circuit 15, to the CRT 16, where it is displayed. Then, as shown in FIG. 20, a new DVHS operating screen 72 is displayed on the CRT display screen 61.

Figure 20:
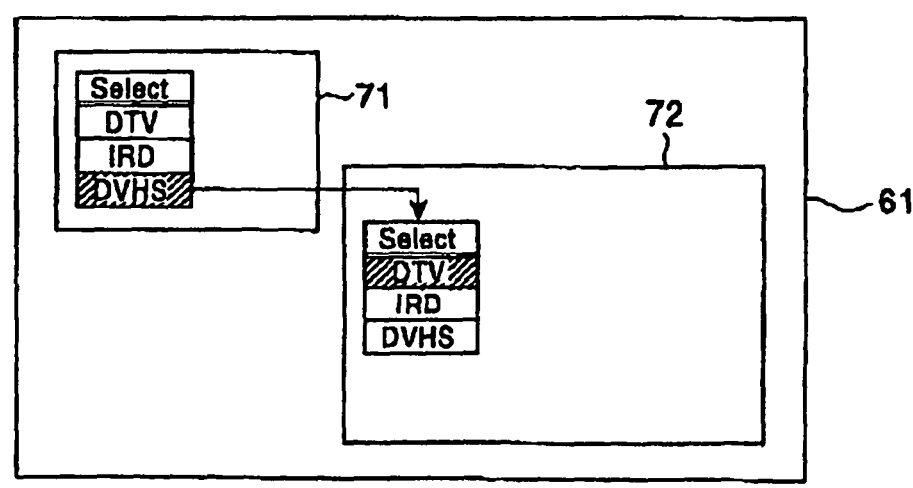
FIG. 20 is a diagram for describing the processing screen displayed on the DTV.

In step S6, the user makes reference to the CRT display screen 61 shown in FIG. 20, and selects the button of the IRD 4 displayed on the DVHS operating screen 72. Signals indicating that the user has selected the IRD 4 button is input to the CPU 12 from the operating panel 17 or the infrared photoreceptor 18.

In step S7, the CPU 12 transmits a USER_ACTION command to the DVHS 3 indicating that the user has selected the IRD 4 (i.e., with an identification name indicating that the GUI element is one corresponding to the button for selecting the IRD 4 described in the element identifier area, and "select" described in the action type area), via the IEEE1394 interface 11 and IEEE1394 serial bus 1. The DVHS 3 which has received this USER_ACTION command returns a response, and then transmits the GUI data changed according to the operation of the user to the DTV 2 using asynchronous connection (the processing in step S34 in the later-described FIG. 23).

In step S8, the IEEE1394 interface 11 receives GUI data transmitted from the DVHS 3, and outputs signals indicating that new GUI data has been received to the CPU 12.

In step S9, the CPU 12 outputs the data received by the IEEE1394 interface 11 in step S8 via the multiplex separating unit 13, picture generating unit 14, and CRT driving circuit 15, to the CRT 16, where it is displayed. Then, as shown in FIG. 21, a new button is displayed on the DVHS operating screen 72 on the CRT display screen 61, for operating the IRD 4 (in this case, channel selection).

Figure 21:
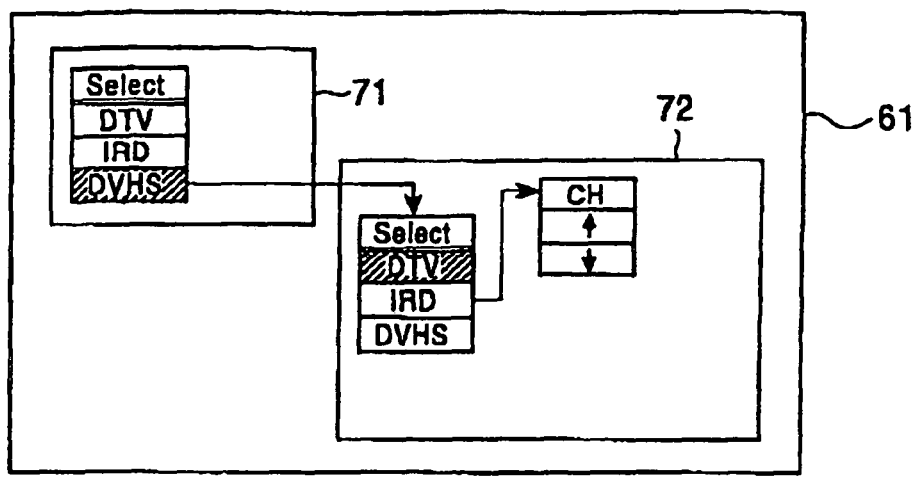
FIG. 21 is a diagram for describing the processing screen displayed on the DTV.

In step S10, the user changes the channel of the IRD 4 (in this case the user presses the button for changing the channel) on the DVHS 3 operating screen displayed on the display screen of the CRT 16 shown in FIG. 21. Signals indicating that the user has changed the IRD 4 channel are input to the CPU 12 from the operating panel 17 or the infrared photoreceptor 18.

In step S11, the CPU 12 transmits a USER_ACTION command to the DVHS 3 indicating that the user has pressed a button for changing the channel of the IRD 4, via the IEEE1394 interface 11 and IEEE1394 serial bus 1. The DVHS 3 which has received this USER_ACTION command returns a response, and transmits an AV/C command for controlling the IRD 4 according to the operations of the user to the IRD 4, (the processing in step S37 in the later-described FIG. 23), and further transmits the GUI data changed according to the changing of the IRD channel to the DTV 2 using asynchronous connection (the processing in step S38 in the later-described FIG. 23).

In step S12, the IEEE1394 interface 11 receives GUI data transmitted from the DVHS 3, and outputs signals indicating that new GUI data has been received to the CPU 12. The CPU 12 outputs the data received via the multiplex separating unit 13, picture generating unit 14, and CRT driving circuit 15, to the CRT 16. Consequently, the display portion for the IRD 4 channel on the DVHS operating screen 72 is changed.

In step S13, the user makes reference to the CRT display screen 61 shown in FIG. 21, and selects the button of the DVHS 3 displayed on the operating screen of the DVHS 3. Signals indicating that the user has selected the DVHS 3 button is input to the CPU 12 from the operating panel 17 or the infrared photoreceptor 18.

In step S14, the CPU 12 transmits a USER_ACTION command to the DVHS 3 indicating that the user has selected the DVHS 3, via the IEEE1394 interface 11 and IEEE1394 serial bus 1. The DVHS 3 which has received this USER_ACTION command returns a response to the DTV, and then transmits the GUI data changed according to the operation of the user to the DTV 2 using asynchronous connection (the processing in step S40 in the later-described FIG. 24).

In step S15, the IEEE1394 interface 11 receives GUI data transmitted from the DVHS 3, and outputs signals to the CPU 12 indicating that new GUI data has been received.

Figure 22:
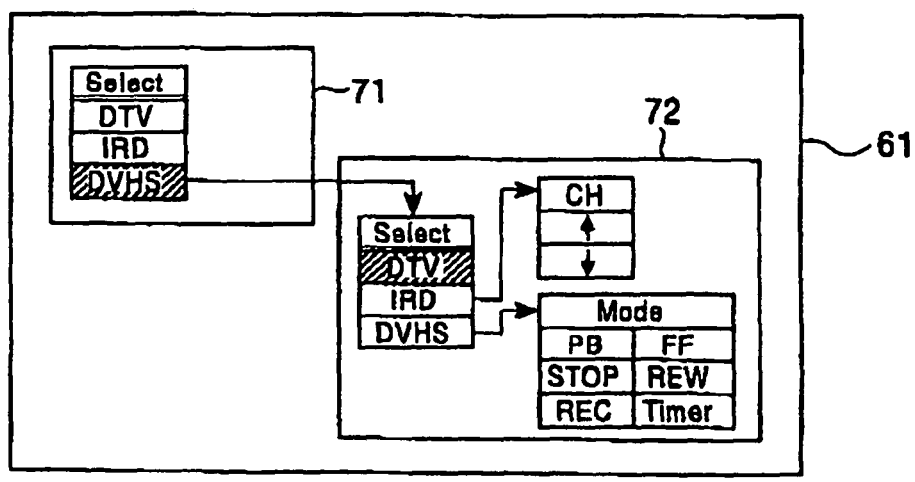
FIG. 22 is a diagram for describing the processing screen displayed on the DTV.

In step S16, the CPU 12 outputs the data received by the IEEE1394 interface 11 in step S15 via the multiplex separating unit 13, picture generating unit 14, and CRT driving circuit 15, to the CRT 16, where it is displayed. As shown in FIG. 22, a new button is displayed on the DVHS operating screen 72 on the CRT display screen 61, for operating the DVHS 3 (in this case, action mode selection).

In step S17, the user selects the REC button from the DVHS operating screen 72 displayed on the CRT display screen 61 shown in FIG. 22. Signals indicating that the user has selected the REC button on the DVHS 3 operating screen 72 are input to the CPU 12 from the operating panel 17 or the infrared photoreceptor 18.

In step S18, the CPU 12 transmits a USER_ACTION command to the DVHS 3 indicating that the user has selected the REC button, via the IEEE1394 interface 11 and IEEE1394 serial bus 1. The DVHS 3 which has received this USER_ACTION command returns a response, and then starts the recording processing according to the operation of the user (the processing in step S42 in the later-described FIG. 24).

In step S19, the user selects the STOP button from the DVHS operating screen 72 displayed on the CRT display screen 61 shown in FIG. 22. Signals indicating that the user has selected the STOP button on the DVHS operating screen 72 are input to the CPU 12 from the operating panel 17 or the infrared photoreceptor 18.

In step S20, the CPU 12 transmits a USER_ACTION command to the DVHS 3 indicating that the user has selected the STOP button, via the IEEE1394 interface 11 and IEEE1394 serial bus 1. The DVHS 3 which has received this USER_ACTION command returns a response, and then ends the recording processing according to the operation of the user (the processing in step S44 in the later-described FIG. 24).

In step S21, the CPU 12 transmits to the DVHS 3 a GUI_UPDATE command with "stop" described in the sub-function area thereof via the IEEE1394 interface 11 and IEEE1394 serial bus 1, and the processing ends.

Now, while the above-described arrangement involves the user operations instructing the starting and ending of the recording processing, an arrangement may be made for example wherein a record reservation setting button is provided to the DVHS operating screen 72 on the CRT display screen 61 shown in FIG. 22, such that the CPU 12 transmits USER_ACTION commands to the DVHS 3 via the IEEE1394 interface 11 and IEEE1394 serial bus 1, according to the recording start time and recording end time set by the user.

Next, description will be made with reference to the flowcharts in FIGS. 23 and 24 regarding the processing of the DVHS 3 which is performed in parallel with the processing of the DTV 2 described with FIGS. 17 and 18.

Figure 17:
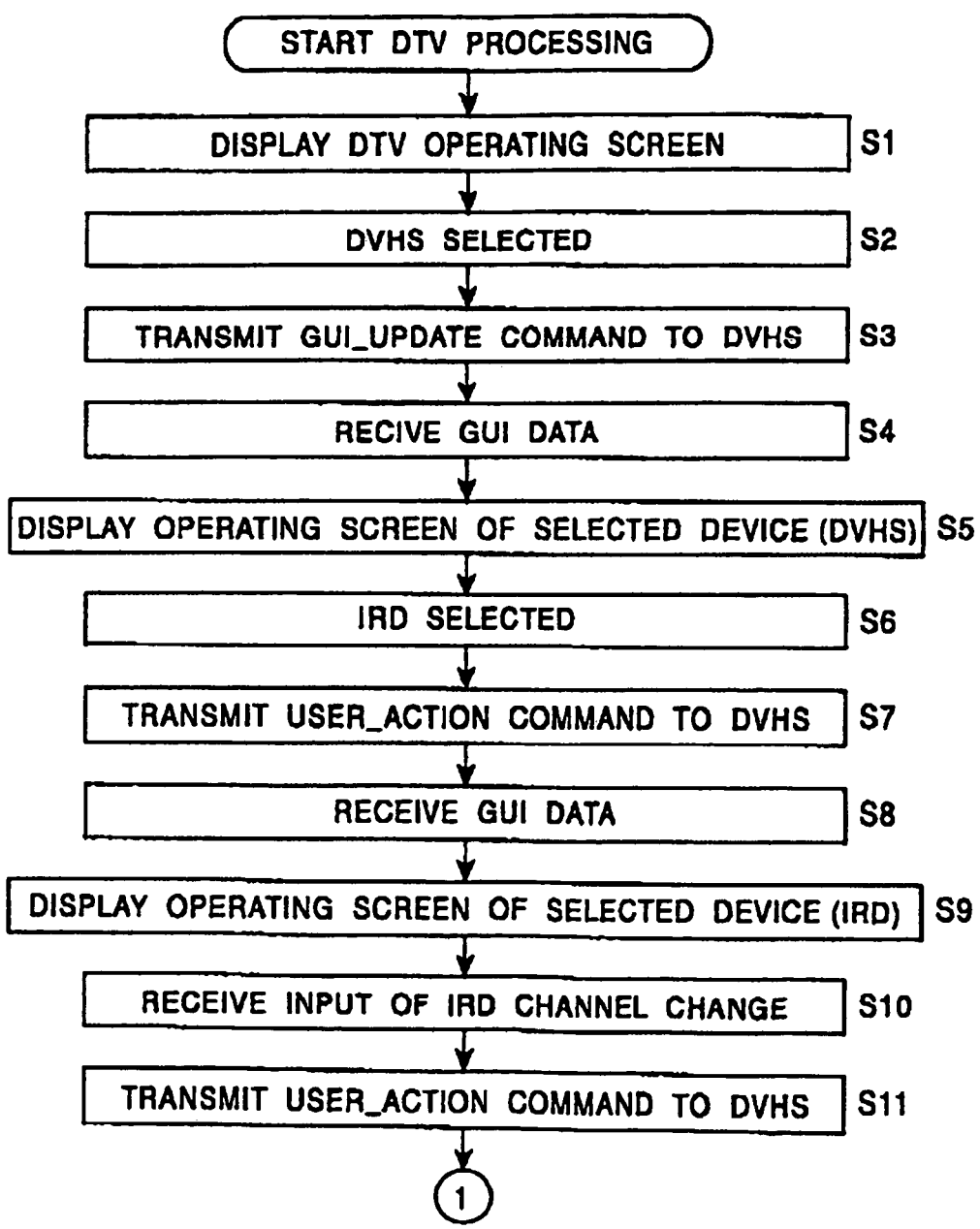
FIG. 17 is a flowchart for describing the processing of the DTV.

In step S31, the IEEE1394 interface 44 receives from the DTV 2 GUI_UPDATE command (the command transmitted by the CPU 12 of the DTV 2 in step S3 in FIG. 17) requesting updating of the GUI data corresponding to the operation screen of the DVHS 3, via the IEEE1394 serial bus 1, and inputs this command to the CPU 43.

In step S32, the CPU 43 returns a response to the DTV 2 via the IEEE1394 interface 44 and IEEE1394 serial bus 1, reads out data corresponding to its own operating screen from the GUI engine 46, and transmits this to the DTV 2 via the IEEE1394 interface 44 and IEEE1394 serial bus 1. The DTV 2 receives this data corresponding to the operating screen of the DVHS 3, and displays the data on the CRT display screen 61 (the processing of steps S4 and S5 in FIG. 17).

In step S33, the IEEE1394 interface 44 receives a USER_ACTION command from the DTV 2 via the IEEE1394 serial bus 1 indicating that the user has selected the icon representing the IRD 4 on the DVHS operating screen 72 of the DTV (the command transmitted by the CPU 12 of the DTV 2 in step S7 of FIG. 17), and inputs this to the CPU 43.

In step S34, the CPU 43 returns a response to the DTV 2 via the IEEE1394 interface 44 and IEEE1394 serial bus 1, confirms that the user has selected the IRD 4 from the input USER_ ACTION command, causes the GUI engine 46 to generate GUI data corresponding to the operating buttons of the IRD 4 to the DTV 2, and transmits GUI data corresponding to the addition of operating buttons for the IRD 4, via the IEEE1394 interface 44 and IEEE1394 serial bus 1.

In step S35, the CPU 43 calls an AV/C command for generating a point-to-point connection from the RAM 48, in order to enable real-time transfer of streaming data (continuous data) from the IRD 4 to the DVHS 3, transmits to the IRD 4 via the IEEE1394 interface 44 and IEEE1394 serial bus 1, and establishes a point-to-point connection between the DVHS 3 and the IRD 4.

In step S36, the IEEE1394 interface 44 receives a USER_ACTION command from the DTV 2 via the IEEE1394 serial bus 1 indicating that the user has pressed a button for changing the channel of the IRD 4 on the DVHS operating screen 72 of the DTV 2 (the command transmitted by the CPU 12 of the DTV 2 in step S11 of FIG. 17), and outputs this USER_ACTION command to the CPU 43.

In step S37, the CPU 43 returns a response to the DTV 2 via the IEEE1394 interface 44 and IEEE1394 serial bus 1, reads out a DIRECT_SELECT_INFORMATION TYPE command which is an AV/C command for instructing changing of channels, from the RAM 48, and transmits this to the IRD 4 via the IEEE1394 interface 44 and IEEE1394 serial bus 1.

Then, the CPU 52 of the IRD 4 receives input of the DIRECT_SELECT_INFORMATION_TYPE command via the IEEE1394 serial bus 1 and IEEE1394 interface 53. The CPU 52 generates control signals for changing the received channel according to the instructions of the input commands, and outputs the control signals to the CS tuner main unit 55. The CS tuner main unit 55 changes the received channel according to the input control signals.

In step S38, the CPU 43 inputs signals indicating that the channel of the IRD 4 has been changed, to the GUI engine 46, the GUI engine 46 changes the GUI data corresponding to the channel of the IRD 4, and transmits the GUI data corresponding to the channel change of the IRD 4 to the DTV 2 via the IEEE1394 interface 44 and IEEE1394 serial bus 1.

Figure 18:
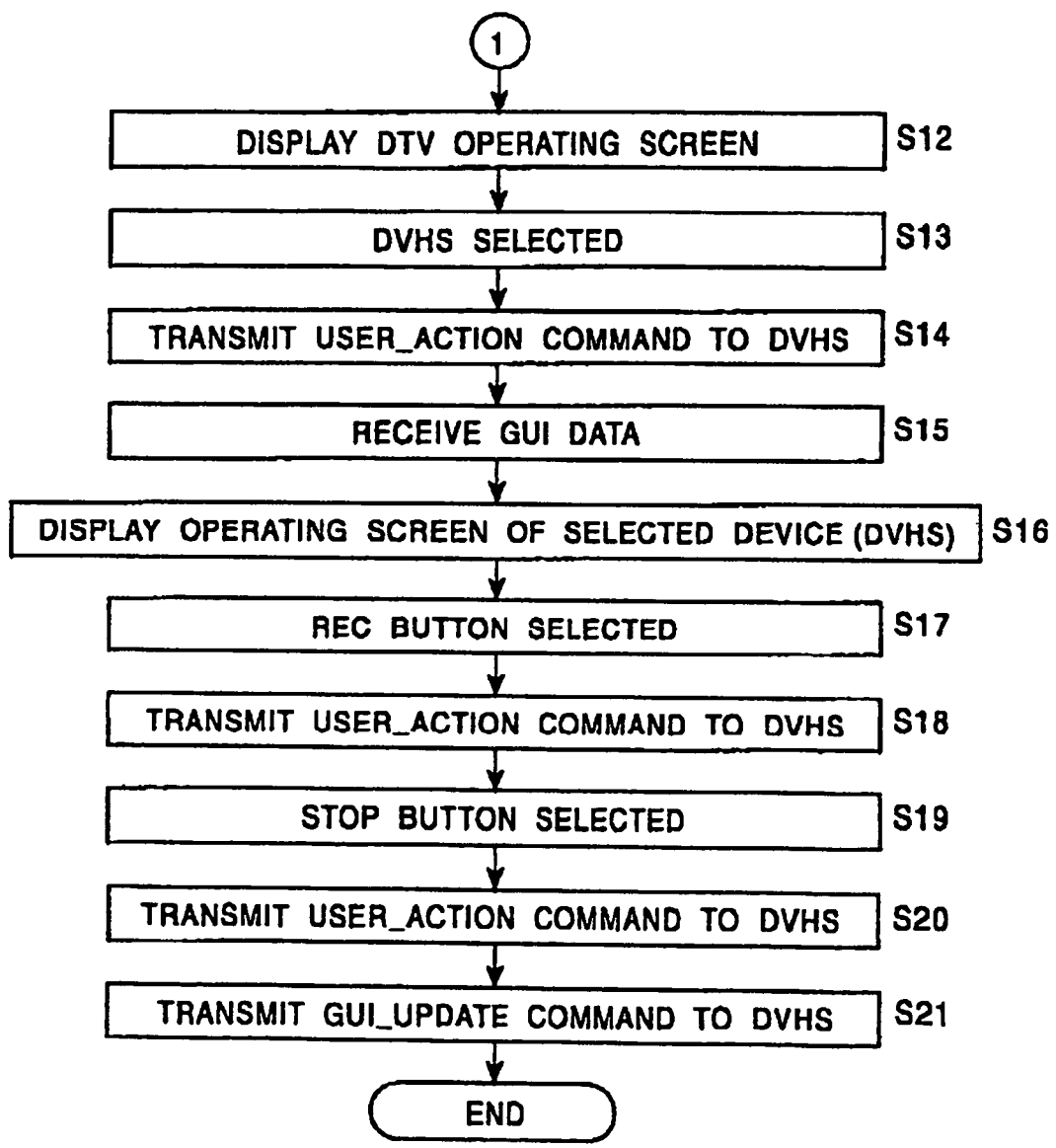
FIG. 18 is a flowchart for describing the processing of the DTV.

In step S39, the IEEE1394 interface 44 receives a USER_ACTION command from the DTV 2 via the IEEE1394 serial bus 1 indicating that the user has selected the icon representing the DVHS 3 on the DVHS operating screen 72 of the DTV 2 (the command transmitted by the CPU 12 of the DTV 2 in step S14 of FIG. 18). The IEEE1394 interface 44 outputs this received USER_ACTION command to the CPU 43.

In step S40, the CPU 43 returns a response to the DTV 2 via the IEEE1394 interface 44 and IEEE1394 serial bus 1, and inputs signals indicating that the DVHS 3 has been selected to the GUI engine 46. The GUI engine 46 generates GUI data corresponding to the DVHS operating buttons, and transmits GUI data corresponding to the addition of operating buttons for the DVHS 3 to the DTV 2, via the IEEE1394 interface 44 and IEEE1394 serial bus 1.

In step S41, the IEEE1394 interface 44 receives a USER_ACTION command from the DTV 2 via the IEEE1394 serial bus 1 indicating that the user has selected the REC button of the DTV 2 on the DVHS operating screen 72 (the command transmitted by the CPU 12 of the DTV 2 in step S18 of FIG. 18). The IEEE1394 interface 44 outputs this received USER_ACTION command to the CPU 43.

In step S42, the CPU 43 returns a response to the DTV 2 via the IEEE1394 interface 44 and IEEE1394 serial bus 1, and executes the processing for starting recording. That is, the CPU 43 transmits an AV/C command to the IRD 4 instructing transmission of received broadcast data using the point-to-point connection established in step S35, via the IEEE1394 interface 44 and IEEE1394 serial bus 1. The CPU 52 of the IRD 4 inputs the AV/C command via the IEEE1394 serial bus 1 and IEEE1394 interface 53, generates control signals for transmitting the broadcast waves received with the antenna 54 as streaming data to the DVHS 3, and outputs to the CS tuner main unit 55. The CS tuner main unit 55 demodulates the received waves input via the antenna 54 according to these control signals, and transmits to the DVHS 3 via the IEEE1394 interface 44 and IEEE1394 serial bus 1.

The IEEE1394 interface 44 receives streaming data transmitted from the IRD 4 via the IEEE1394 serial bus 1. The CPU 43 outputs the received streaming data to the VCR control unit 45 to the IEEE1394 interface 44, and the data input to the VCR control unit 45 is recorded on an unshown video cassette tape.

In step S43, the IEEE1394 interface 44 receives a USER_ACTION command from the DTV 2 via the IEEE1394 serial bus 1 indicating that the user has selected the STOP button of the DTV 2 on the DVHS operating screen 72 (the command transmitted by the CPU 12 of the DTV 2 in step S20 of FIG. 18). The IEEE1394 interface 44 outputs this received USER_ACTION command to the CPU 43.

In step S44, the CPU 43 returns a response to the DTV 2 via the IEEE1394 interface 44 and IEEE1394 serial bus 1, and executes the processing for ending recording. That is, the CPU 43 stops the processing for recording the data input to the VCR control unit 45 onto the unshown video cassette tape, and also transmits an AV/C command to the IRD 4 instructing stopping transmission of streaming data, via the IEEE1394 interface 44 and IEEE1394 serial bus 1. The CPU 52 of the IRD inputs the AV/C command via the IEEE1394 serial bus 1 and IEEE1394 interface 53, generates control signals for stopping transmission of the streaming data, and outputs to the CS tuner main unit 55. The CS tuner main unit 55, upon receiving these control signals, stops transmitting the streaming data.

In step S45, the IEEE1394 interface 44 receives from the DTV 2 a GUI_UPDATE command with "stop" described in the sub-function area thereof (the command transmitted by the CPU of the DTV 2 in step S21 in FIG. 18), via the IEEE1394 serial bus 1. The IEEE1394 interface 44 outputs the received GUI_UPDATE command to the CPU 43. The CPU 43 receives input of this GUI_UPDATE command, returns a response to the DTV 2 via the IEEE1394 interface 44 and IEEE1394 serial bus 1, and stops transmission of GUI data to the DTV 2, thereby ending the processing.

Now, description has been made so far regarding cases using a network comprising an IEEE1394 serial bus 1, but the same processing may be performed on a network configured using other connection methods, as well.

The above-described series of the processing can be executed with hardware, or can be executed with software. In the event of executing the series of the processing with software, programs comprising this software may be installed in a computer (e.g., the CPU 12 in FIG. 2 and the CPU 43 in FIG. 3) assembled into an information processing apparatus serving as dedicated hardware, or installed in a common-use personal computer for example, which is capable of executing various functions by installing various programs thereto.

As shown in FIG. 2, the recording medium is not only configured of packaged media with the program recorded thereon separate from the computer, distributed for providing programs to the user, such as magnetic discs 27 (including floppy disks), optical disks 28 (including CD-ROMs (Compact Disk Read-Only Memory) and DVDs (Digital Versatile Disk)), Magneto-optical disks 29 (including MDs (mini-Disk), or semiconductor memory 30, but also is configured of the ROM 19 on which the program is recorded that is provided to the user in a state pre-assembled into the DTV 2, the RAM 48 on which the program is recorded that is provided to the user in a state pre-assembled into the DVHS 3, and so forth.

Note that the steps describing the program recorded on the recording medium include of course processing performed in time-sequence following the described order, but are not restricted to this, and also include processing executed in parallel or independently even without being performed in time-sequence.

It should be understood that in the present specification, the term "system" refers to the entire equipment configured of the multiple devices.

With the information processing apparatus according to the first aspect, the information processing method according to the second aspect, and the recording medium according to the third aspect, a first control screen for controlling the other information processing apparatuses connected to the network is displayed, second control screen data for controlling the selected information processing apparatus is received in the event that a predetermined information processing apparatus is selected from the other information processing apparatuses based on the first control screen, the received second control screen is displayed, and in the event that predetermined instructions are input based on the second control screen, signals corresponding to the input are output to the selected information processing apparatus, thereby allowing other apparatuses to be controlled event in the event that an apparatus does not have commands for directly controlling other apparatuses.

With the information processing apparatus according to the fourth aspect, the information processing method according to the fifth aspect, and the recording medium according to the sixth aspect, control screen data for controlling itself is output to the other information processing apparatuses via the network, signals corresponding to input from the other information processing apparatuses via the network are received in the event that predetermined instructions are input based on the control screen at the other information processing apparatuses, and processing corresponding to the received signals is executed, so control can be received from apparatuses which do not have control commands.

With the information processing system according to the seventh aspect, a first information processing apparatus displays a first control screen for controlling information processing apparatuses connected to a network including a second information processing apparatus, the second information processing apparatus transmits second control screen data via the network in the event that the second information processing apparatus is selected based on the first control screen, and the first information processing apparatus displays the received second control screen. In the event that predetermined instructions are input based on the second control screen, the first information processing apparatus outputs signals corresponding to the input thereof to the second information processing apparatus, the second information processing apparatus receives the signals corresponding to the input, and executes processing corresponding to the received signals, so a controlling apparatus which does not have control commands can control other controlling apparatuses.

What is claimed is:

1. An information processing apparatus which is connectable to a network with other information processing apparatuses, and which controls itself or other information processing apparatuses via said network, said apparatus comprising a processor for:
    controlling the display of a first control screen for controlling said other information processing apparatuses connected to said network from itself;
    receiving, from a selected information processing apparatus via said network, second control screen data for controlling selection of at least said selected information processing apparatus from said other information processing apparatuses when a predetermined information processing apparatus is selected from said other information processing apparatuses, based on said first control screen;
    controlling a display of a second control screen based on said second control screen data; and
    outputting signals corresponding to input to said selected information processing apparatus, when predetermined instructions are input, based on said second control screen.

2. An information processing method for an information processing apparatus which is connectable to a network with other information processing apparatuses, and which controls itself or other information processing apparatuses via said network, said method comprising the steps of:
    a first display control step for controlling the display of a first control screen for controlling said other information processing apparatuses connected to said network from itself;
    a receiving step for receiving, from a selected information processing apparatus via said network, second control screen data for controlling selection of at least said selected information processing apparatus from said other information processing apparatuses, when a predetermined information processing apparatus is selected from said other information processing apparatuses, based on said first control screen;
a second display control step for controlling display of a second control screen based on said second control screen data received by the processing of said receiving step; and
an output step for outputting signals corresponding to input to said selected information processing apparatus, when predetermined instructions are input, based on said second control screen.

3. A non-transitory recording medium recording a computer-readable program for an information processing apparatus which is connectable to a network with other information processing apparatuses, and which controls itself or other information processing apparatuses via said network, said program comprising:
a first display control step for controlling the display of a first control screen for controlling said other information processing apparatuses connected to said network from itself;
a receiving step for receiving, from a selected information processing apparatus via said network, second control screen data for controlling selection of at least said selected information processing apparatus from said other information processing apparatuses, when a predetermined information processing apparatus is selected from said other information processing apparatuses, based on said first control screen;
a second display control step for controlling display of a second control screen based on said second control screen data received by the processing of said receiving step; and
an output step for outputting signals corresponding to input to said selected information processing apparatus, when predetermined instructions are input, based on said second control screen.

4. An information processing apparatus which is connectable to a network with other information processing apparatuses, and which is controllable by said other information processing apparatuses via said network, said apparatus comprising a processor for:
outputting control screen data for controlling itself to said other information processing apparatuses via said network;
receiving signals (i) corresponding to input from said other information processing apparatuses, via said network, when predetermined instructions are input based on said control screen data, at said other information processing apparatuses and (ii) indicating a command by which the other information processing apparatuses confirm a version of the information processing apparatus and a request by the other information processing apparatus for updated graphical user interface (GUI) data from the information processing apparatus; and
executing processing corresponding to the signals received.

5. An information processing method for an information processing apparatus which is connectable to a network with other information processing apparatuses, and which is controllable by said other information processing apparatuses via said network, said method comprising:
an output step for outputting control screen data for controlling itself to said other information processing apparatuses via said network;
a receiving step for receiving signals (i) corresponding to input from said other information processing apparatuses via said network, when predetermined instructions are input based on said control screen data, at said other information processing apparatuses and (ii) indicating a command by which the other information processing apparatuses confirm a version of the information processing apparatus and a request by the other information processing apparatus for updated graphical user interface (GUI) data from the information processing apparatus; and
an executing step for executing processing corresponding to the signals received by the processing of said receiving step.

6. A non-transitory recording medium recording a computer-readable program for an information processing apparatus which is connectable to a network with other information processing apparatuses, and which is controllable by said other information processing apparatuses via said network, said program comprising:
an output step for outputting control screen data for controlling itself to said other information processing apparatuses via said network;
a receiving step for receiving signals (i) corresponding to input from said other information processing apparatuses via said network, when predetermined instructions are input based on said control screen data, at said other information processing apparatuses and (ii) indicating a command by which the other information processing apparatuses confirm a version of the information processing apparatus and a request by the other information processing apparatus for updated graphical user interface (GUI) data from the information processing apparatus; and
an executing step for executing processing corresponding to the signals received by the processing of said receiving step.

7. An information processing system which connects at least a first information processing apparatus and a second information processing apparatus with a network, and performs information processing;
said first information processing apparatus comprising a first processor for:
controlling the display of a first control screen for controlling said other information processing apparatuses, including said second information processing apparatus, connected to said network from itself;
receiving, from said second information processing apparatus via said network, second control screen data for controlling selection of at least said second information processing apparatus from said other information processing apparatuses, when said second information processing apparatus is selected from said other information processing apparatuses, based on said first control screen;
controlling display of a second control screen based on said second control screen data; and
outputting signals corresponding to input to said second information processing apparatus, when predetermined instructions are input, based on said second control screen; and
said second information processing apparatus comprising a second processor for:
outputting control screen data for controlling itself to said first information processing apparatus via said network;
receiving signals corresponding to input from said first information processing apparatuses via said network, when predetermined instructions are input based on said control screen, at said first information processing apparatus; and executing processing corresponding to the signals received.

8. The information processing system according to claim 7, wherein said network is a network using an IEEE1394 serial bus.

\* \* \* \* \*